(12) United States Patent
Guidolin et al.

(10) Patent No.: US 10,480,707 B2
(45) Date of Patent: Nov. 19, 2019

(54) ORIENTABLE SUPPORT FOR VIDEO-PHOTOGRAPHIC APPARATUSES

(71) Applicant: LINO MANFROTTO + CO. S.P.A., Cassola (VI) (IT)

(72) Inventors: Stefano Guidolin, Rosa' (IT); Paolo Speggiorin, Mussolente (IT); Filippo Lanzarin, Bassano del Grappa (IT)

(73) Assignee: VITEC IMAGING SOLUTIONS SPA, Cassola (IT)

( * ) Notice: Subject to any disclaimer, the term of this patent is extended or adjusted under 35 U.S.C. 154(b) by 0 days.

(21) Appl. No.: 15/750,104

(22) PCT Filed: Aug. 2, 2016

(86) PCT No.: PCT/IB2016/054627
§ 371 (c)(1),
(2) Date: Feb. 2, 2018

(87) PCT Pub. No.: WO2017/021870
PCT Pub. Date: Feb. 9, 2017

(65) Prior Publication Data
US 2018/0224056 A1 Aug. 9, 2018

(30) Foreign Application Priority Data

Aug. 6, 2015 (IT) .................. 102015000042922

(51) Int. Cl.
*F16M 11/14* (2006.01)
*H04N 5/225* (2006.01)
(Continued)

(52) U.S. Cl.
CPC ........... *F16M 11/14* (2013.01); *H04N 5/2251* (2013.01); *F16C 11/068* (2013.01);
(Continued)

(58) Field of Classification Search
CPC .... F16M 11/14; F16M 11/28; F16M 11/2078; F16M 2200/024; H04N 5/2251; F16C 11/10; F16C 11/0695; F16C 11/068
See application file for complete search history.

(56) References Cited

U.S. PATENT DOCUMENTS 3,575,369 A * 4/1971 Tetlow .................. F16M 13/04
248/158
3,847,490 A * 11/1974 Uchida ................. F16C 11/068
184/109
(Continued)

FOREIGN PATENT DOCUMENTS

DE 2105241 A1 8/1972
DE 202013006889 U1 9/2013
(Continued)

*Primary Examiner* — Gevell V Selby
(74) *Attorney, Agent, or Firm* — Pearne & Gordon LLP

(57) ABSTRACT

Orientable support (1) for video-photographic apparatus, comprising an articulation device (4) with a first (5) and a second articulation member (6) provided with respective attachment means for being attached respectively to a supporting member (2, 20) of said support (1) and to a video-photographic apparatus, or vice versa, and reciprocally movable in order to orient said video-photographic apparatus with respect to said supporting member (20), said first articulation member comprising an internally hollow shell-shaped body (5) defining a housing cavity (10) for said second articulation member (6), said second articulation member comprising a spherical ball (6) capable of sliding in said housing cavity (10), said ball (6) and said housing cavity (10) being shaped in such a way that a gap (11) is formed therebetween, said gap containing a viscous fluid (V) suitable for regulating the rotations of said ball (6) in said housing cavity (10).

16 Claims, 7 Drawing Sheets

(51) Int. Cl.
*F16C 11/06* (2006.01)
*F16C 11/10* (2006.01)

(52) U.S. Cl.
CPC ........... *F16C 11/0695* (2013.01); *F16C 11/10* (2013.01); *F16M 2200/024* (2013.01)

(56) References Cited

U.S. PATENT DOCUMENTS

| | | | | |
|---|---|---|---|---|
| 3,945,739 | A * | 3/1976 | Abe | B60G 7/005 |
| | | | | 403/138 |
| 4,899,854 | A | 2/1990 | Cartoni | |
| 8,028,963 | B2 | 10/2011 | Speggiorin | |
| 9,309,920 | B2 | 4/2016 | Li | |
| 2009/0084912 | A1* | 4/2009 | Speggiorin | F16M 11/16 |
| | | | | 248/176.3 |
| 2012/0269503 | A1* | 10/2012 | Hale | F16M 11/14 |
| | | | | 396/428 |
| 2015/0003895 | A1* | 1/2015 | Li | F16C 11/0623 |
| | | | | 403/90 |

FOREIGN PATENT DOCUMENTS

| | | | |
|---|---|---|---|
| WO | 9721885 | A1 | 6/1997 |
| WO | 2007039000 | A1 | 4/2007 |

\* cited by examiner

ORIENTABLE SUPPORT FOR VIDEO-PHOTOGRAPHIC APPARATUSES

TECHNICAL FIELD

The present invention relates to an orientable support for optical or video/photographic apparatus, having the features set out in the preamble to the main claim.

The support of the invention is preferably a monopod or a tripod or a supporting head for video-photographic apparatus.

TECHNOLOGICAL BACKGROUND

Supports for optical or video/photographic apparatus have long been used to improve the quality of the filming with respect to those taken freehand.

In some applications, where supports are required that are compact, light and easy to transport, use is widely made of monopods, which are lighter and less bulky than tripods.

Monopods comprise a rod whose length may be telescopically adjustable and which is provided at a first longitudinal end with attachment elements for attaching the video-photographic apparatus, and at the second end with a base for supporting on the ground.

The base may be provided with an articulation for orienting the rod, and therefore the apparatus attached thereto, relative to the base.

The supporting base may be provided with small supporting legs to increase the stability of the monopod.

Such monopods, while improving the ergonomics of the filming, are however not particularly stable, but are subject to considerable vibrations and oscillations in the three axes of movement.

In addition, such supports do not make it possible to obtain a high degree of precision in the steadying of the video-photographic apparatus.

These disadvantages are particularly evident when making videos or films that require a movement of the apparatus, for example about a panoramic axis.

To overcome this disadvantage, in WO2007/039000 in the name of the same applicant, a monopod has been proposed that is equipped with a cylindrical articulation housed in the rod and comprising a housing body in which is rotatably housed a cylinder that is rotatable about the panoramic axis. Between the cylinder and the wall of the housing body is provided a viscous fluid that damps any shocks and vibrations produced when the cylinder is rotated about the panoramic axis. This provides improved adjusting of the positioning about the panoramic axis.

A monopod support is obtained with which it is possible to make films of high quality with movement about the panoramic axis.

With this support, steadying about the panoramic axis is considerably improved, but there remains a not entirely satisfactory regulation of movement about the remaining two axes, tilt and level axes, perpendicular to the panoramic axis and to each other.

Although vibrations along these axes have little influence on the quality of the filming, the need to improve movement along said axes nevertheless remains.

However, the provision of corresponding cylindrical articulations with cylinders that are rotatable respectively about the tilt and level axes would involve a considerable increase in the weight and dimensions of the monopod, and has therefore been abandoned.

In some types of applications, regardless of the type of support used for the video-photographic apparatus, particularly when making video films, it is necessary for the apparatus to be capable of being moved in a very smooth manner, i.e. without any shakes or vibrations that would have a negative impact on the quality of the filming.

DESCRIPTION OF THE INVENTION

The problem addressed by the present invention is that of providing a support for optical or video/photographic apparatus that makes it possible to overcome the limitations described above with reference to the cited prior art.

In particular, it is an aim of the invention to provide a support with an articulation that makes it possible to obtain good regulation of the orientation of the video-photographic apparatus along all three axes of orientation.

Another aim of the invention is to provide a support with an articulation that makes it possible to move the video-photographic apparatus smoothly, without any shakes, along all three axes of orientation.

This problem is solved by the present invention by means of an orientable support produced in accordance with the claims that follow.

BRIEF DESCRIPTION OF THE DRAWINGS

The characteristics and advantages of the invention will become clearer from the detailed description of a preferred embodiment, illustrated by way of non-limitative example, with reference to the accompanying drawings, in which.

PREFERRED EMBODIMENT OF THE INVENTION

Figure 1:
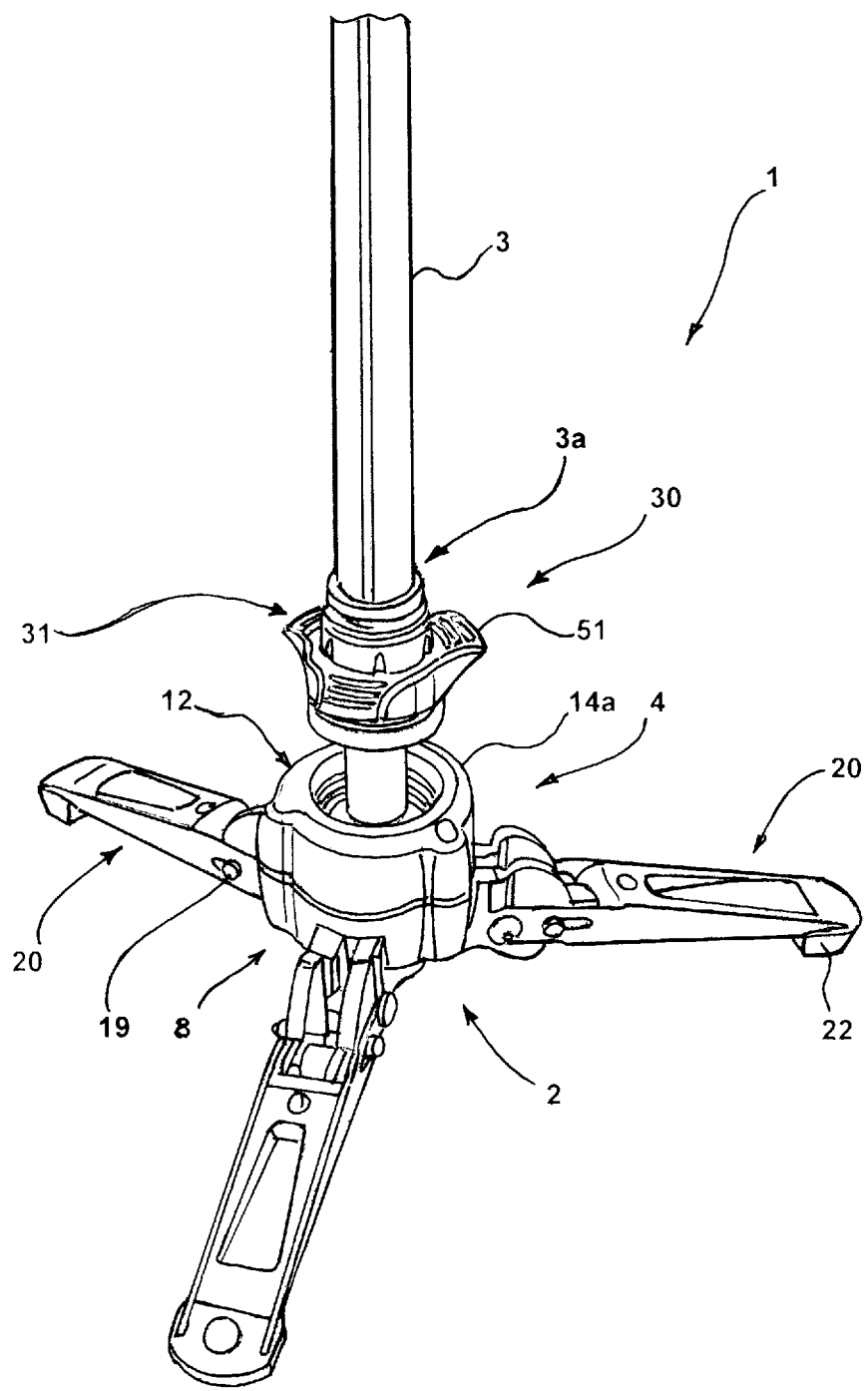
FIG. 1 is an interrupted perspective view of an orientable monopod according to the present invention.
Figure 2:
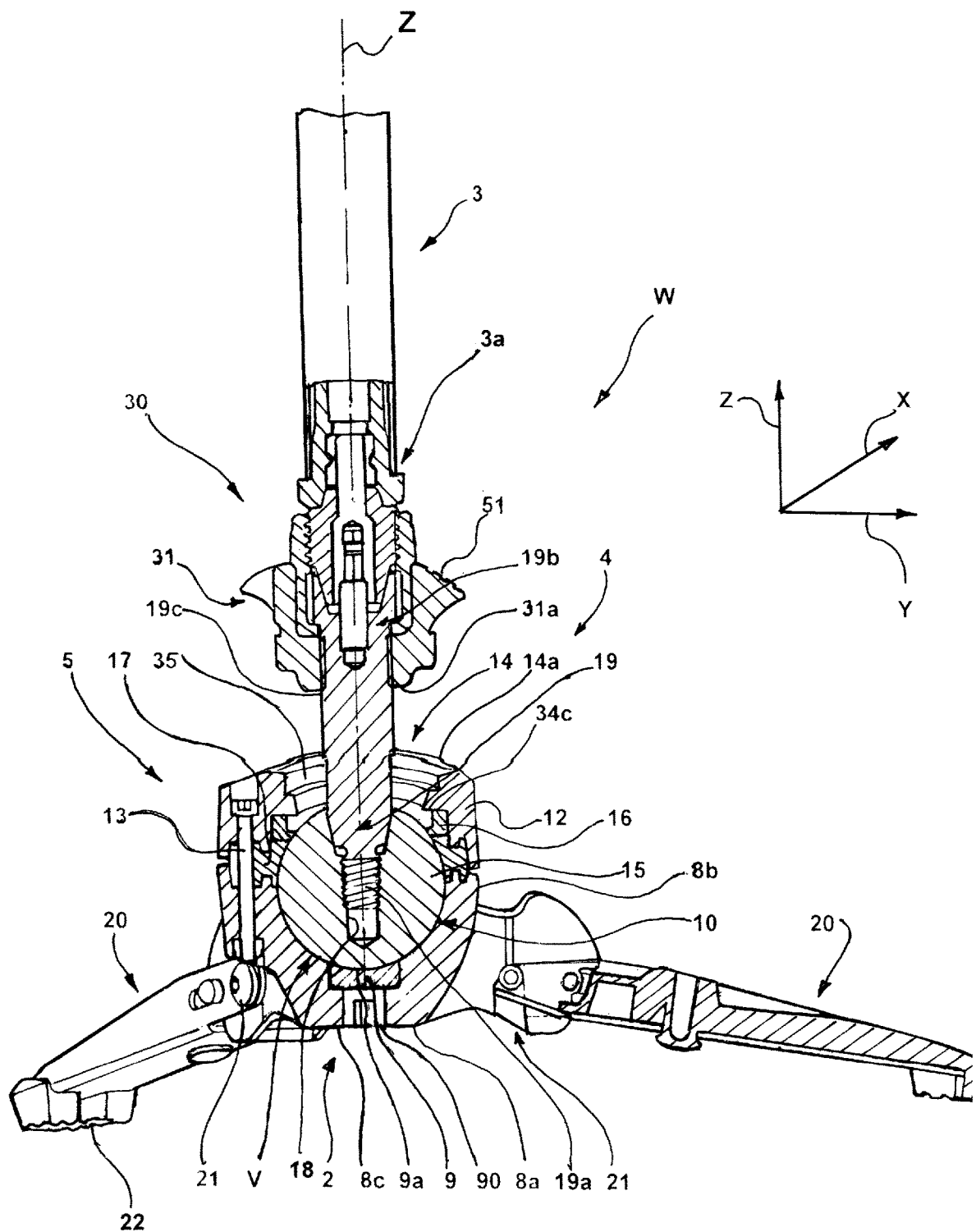
FIGS. 2 and 3 are interrupted sectional views of the monopod of FIG. 1, respectively in a first and a second operating configuration.
Figure 3:
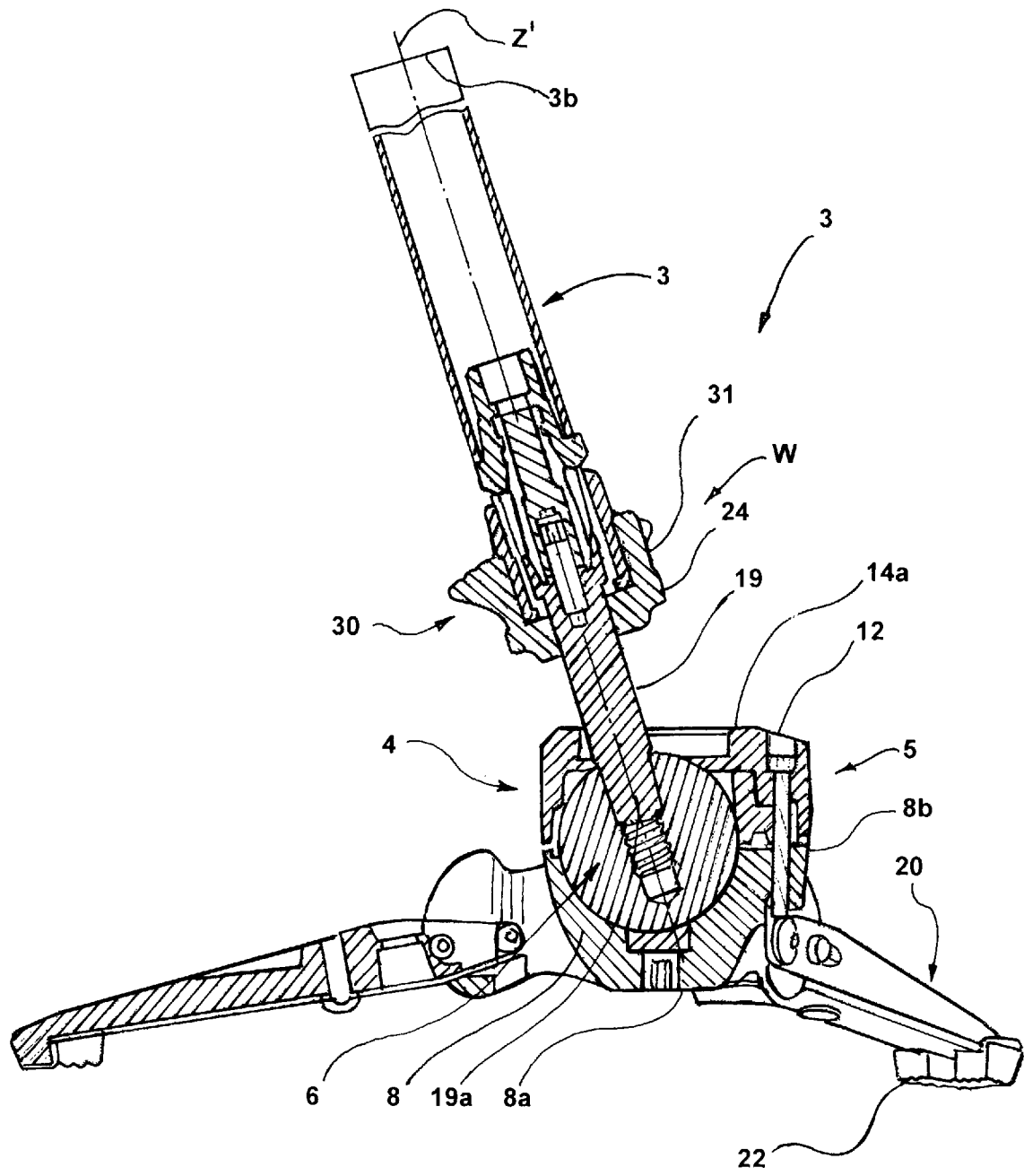
Figure 4:
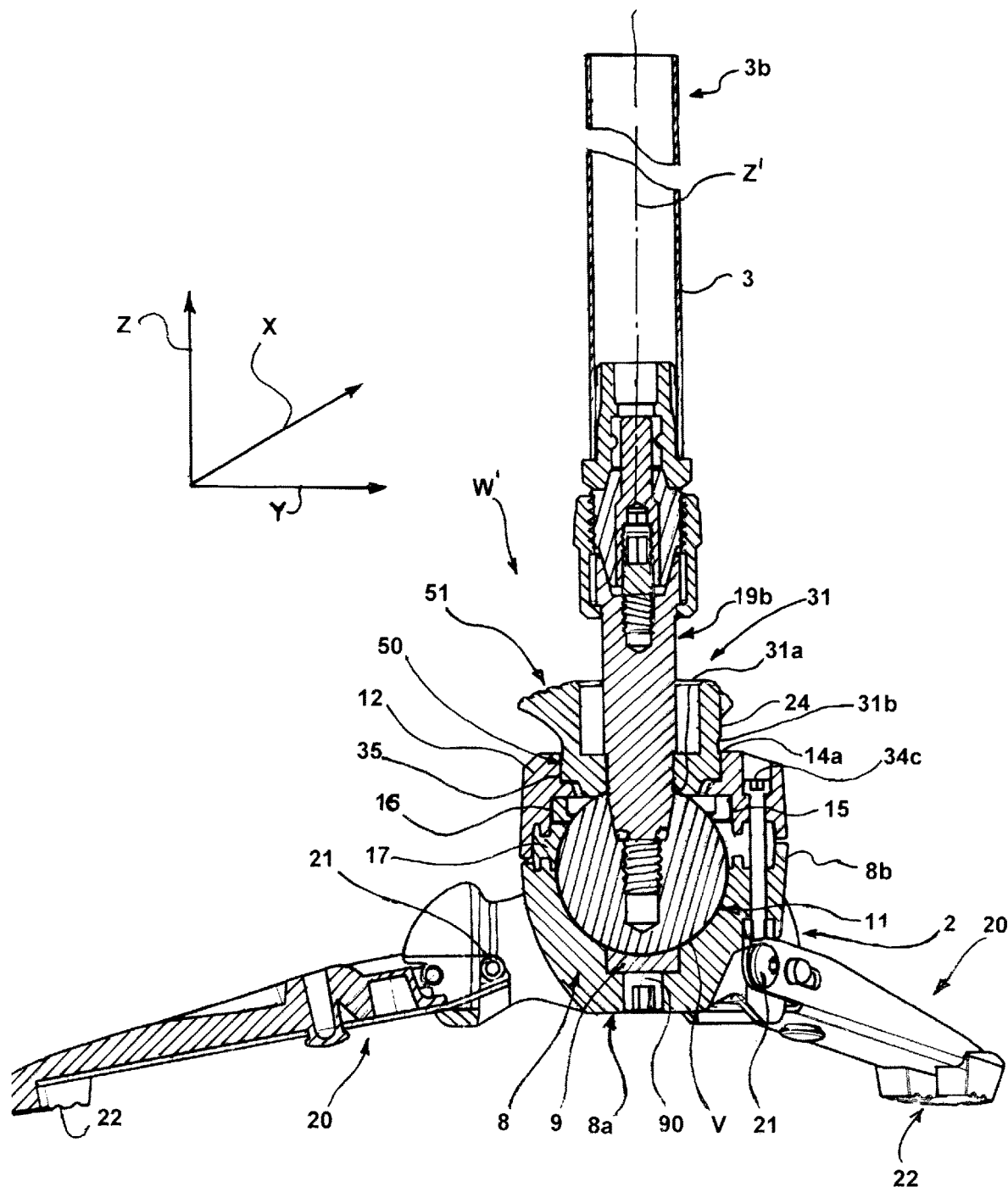
FIG. 4 is an interrupted sectional view of the monopod of FIG. 1 in a third operating configuration.
Figure 4A:
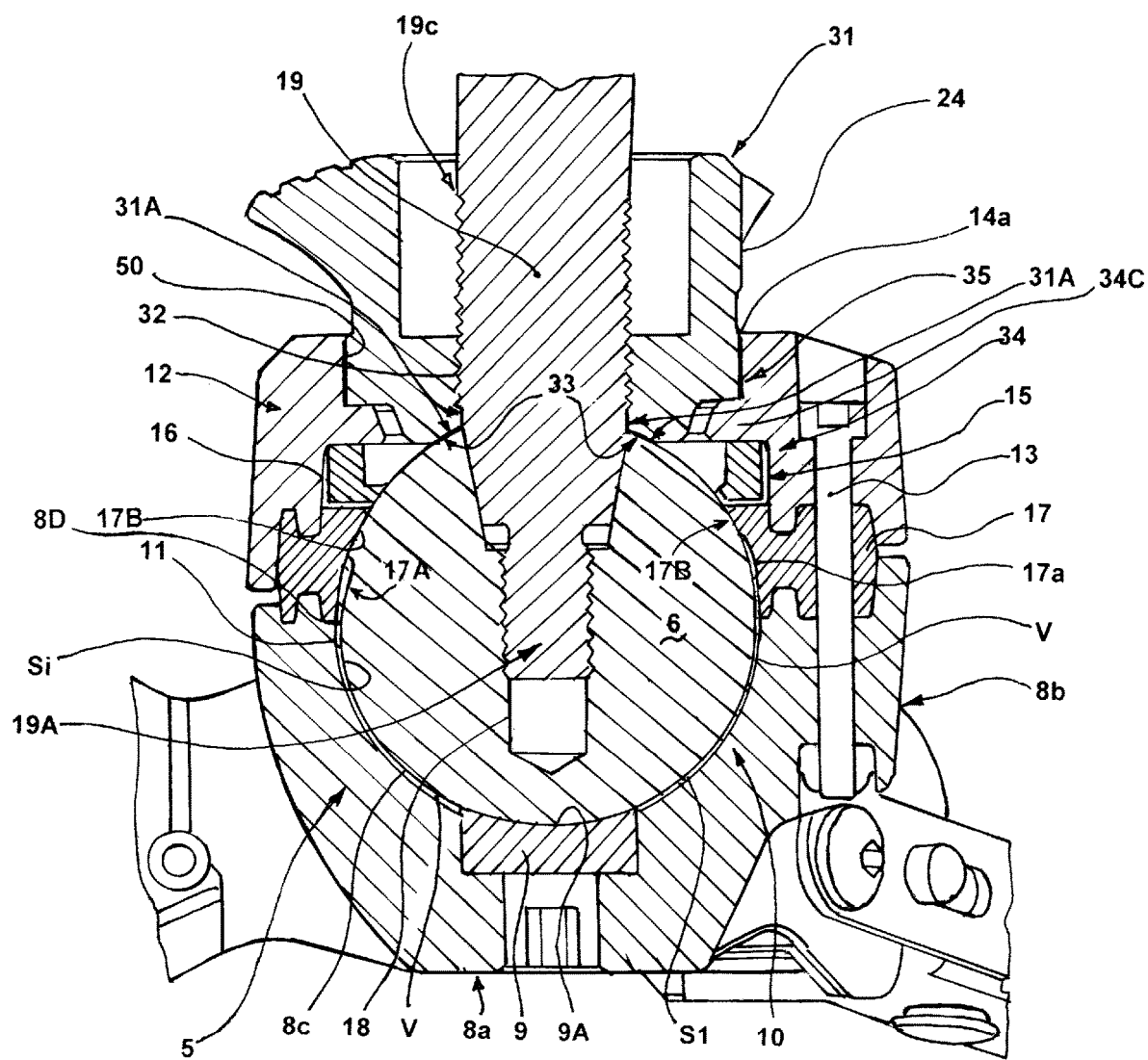
FIG. 4A is an enlarged view of a detail of FIG. 4.
Figure 5:
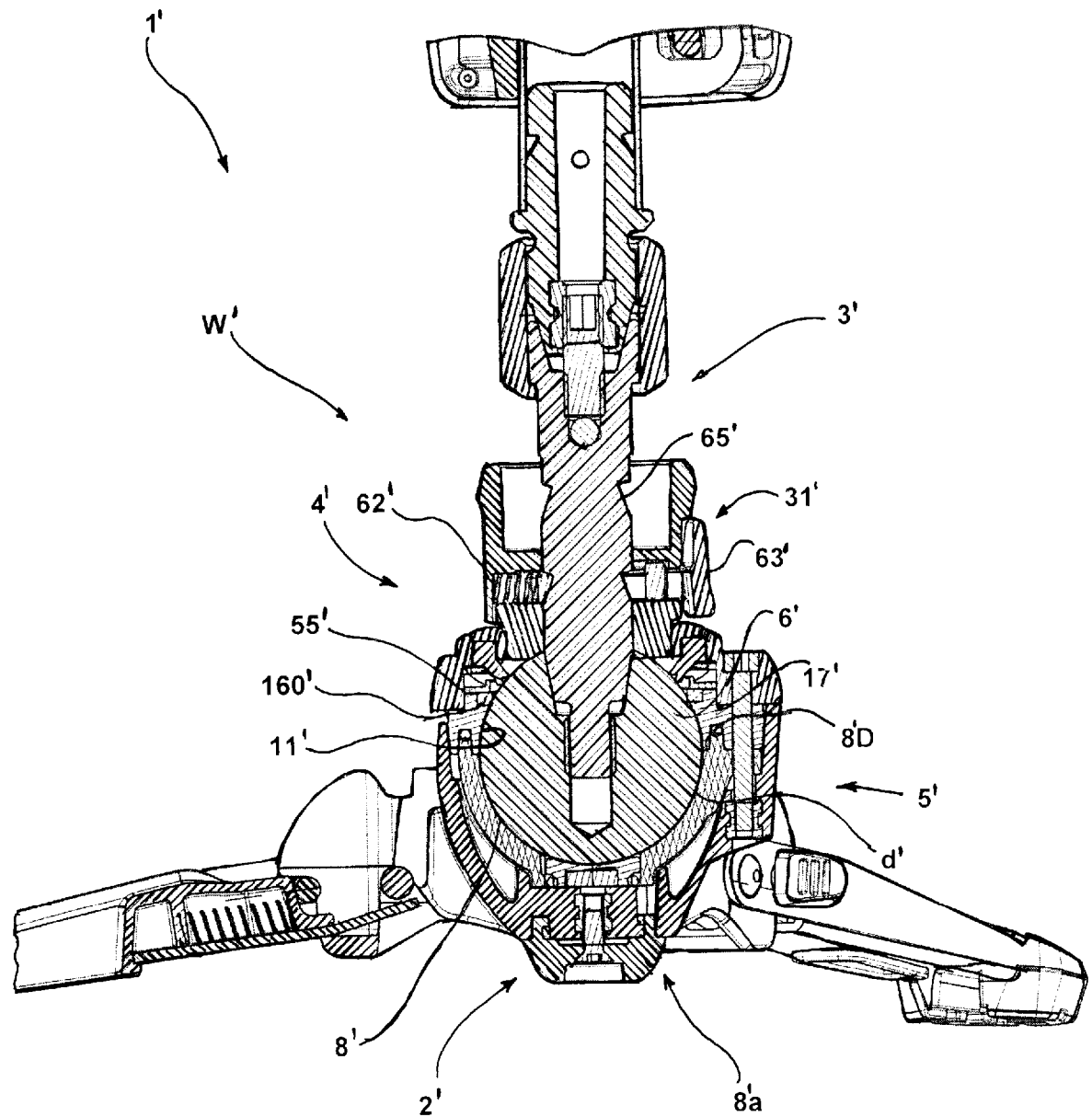
FIG. 5 is an interrupted sectional view of a second version of the monopod according to the invention in a first operating configuration.
Figure 5A:
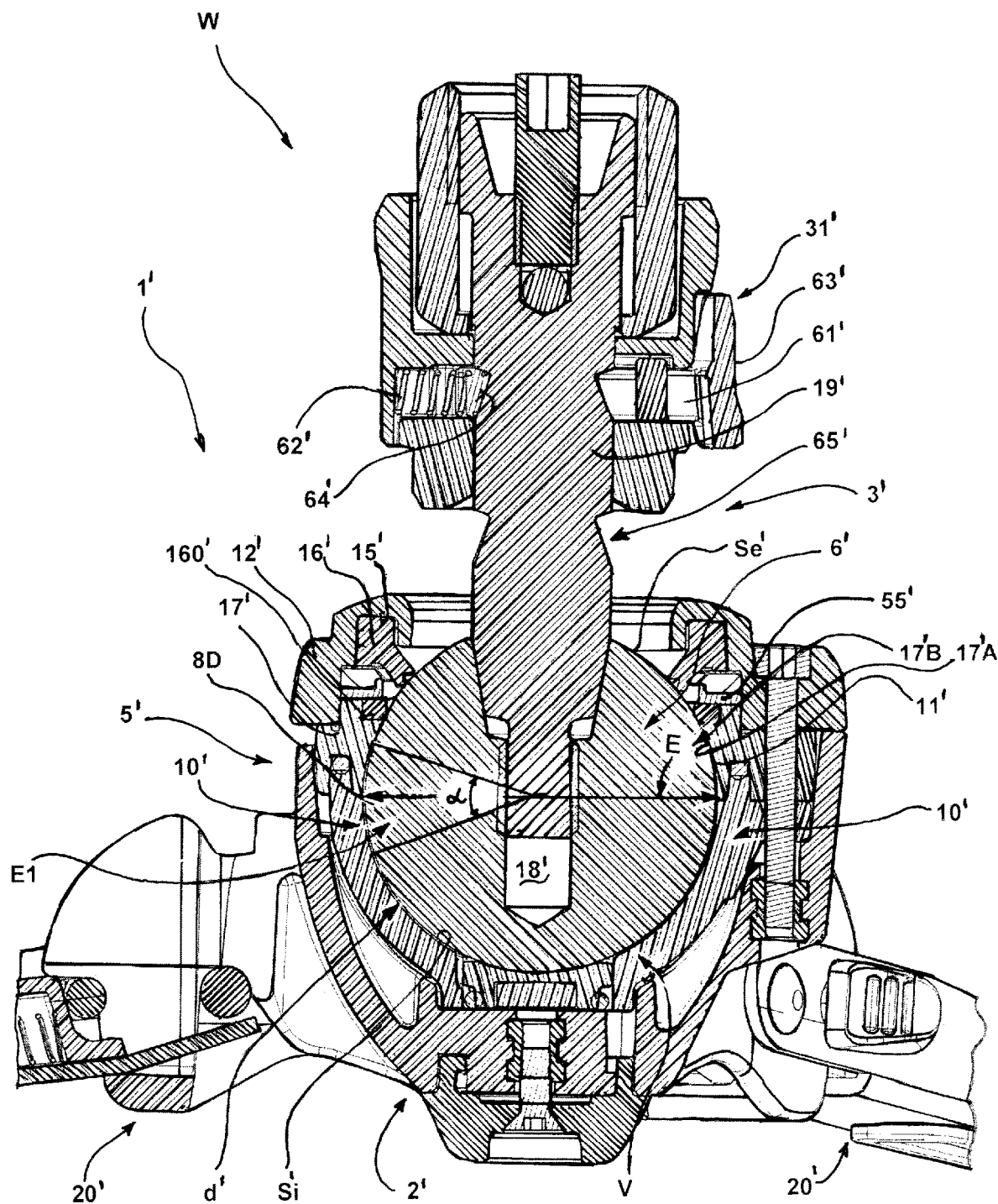
FIG. 5A is an enlarged view of a detail of FIG. 5 in a second operating configuration.

The Figures show an orientable monopod for optical or video/photographic apparatus 1, produced in accordance with the present invention; a first version of the monopod of the invention is shown in FIGS. 1-4 and 4A, while a second version of a monopod according to the invention is shown in FIGS. 5 and 5A.

The various parts of the monopod of FIGS. 5 and 5A will be indicated with the same references used for the corresponding parts of the support of FIGS. 1-4, followed by a superscript, and only those elements that differ with respect to the monopod of FIGS. 1-4 will be described in detail.

Although the following description refers to a monopod, the invention can also be applied to a tripod support, or to a supporting head for video-photographic apparatus, as explained in greater detail below.

The invention is particularly suitable to be used in applications where a high degree of smoothness of the video-photographic apparatus is required, for example when filming video.

The invention is particularly suitable to be used for producing supports that are compact and lightweight but that, at the same time, ensure a high quality of filming.

The monopod 1 comprises a supporting base 2 for allowing stable support of the monopod 1 on the ground, or on a desired supporting surface, a column 3 with predominantly longitudinal development along a longitudinal axis Z', extending from the supporting base 2, and an articulation device 4 provided in the base 2 and suitable for allowing orientation of the column 3 relative to the base 2 and, therefore, for allowing orientation of the video-photographic apparatus attached to the column 3, as described in greater detail below.

For convenience, a Cartesian reference system will be used in the present description, with three orthogonal axes XYZ. It is assumed that the supporting plane of the supporting base 2 is a horizontal plane XY and that the longitudinal axis Z' of the column 3 coincides with the vertical axis Z. In this regard, the panoramic axis (PAN) of the monopod 1 corresponds to the vertical axis Z, while the tilt and level axes correspond respectively to the X and Y axes.

It is understood that, if the supporting plane of the supporting base 2 is not a horizontal plane, the panoramic axis (PAN) is defined as the vertical axis Z, and is therefore also not perpendicular to the supporting plane.

The articulation device 4 comprises a first and a second articulation member rigidly attached by attachment means respectively to the supporting base of the support, or to a generic supporting member, and to the video-photographic apparatus, in such a way that, by means of the articulation device 4, the video-photographic apparatus is orientable relative to the supporting member.

The articulation device 4 comprises a shell-shaped body 5 that is internally hollow so as to define a housing cavity 10 for the slideable housing of a spherical ball 6 rigidly attached to the column 3.

The shell-shaped body 5 may be created integrally with the supporting base 2, as in the version of FIGS. 1-4, or may also be created as an element separate from the supporting base 2, as in the version of FIG. 5.

The shell-shaped body 5 and the spherical ball 6 form respectively the first and the second articulation member of the articulation device 4 and are reciprocally movable in order to orient the column 3, and therefore the video-photographic apparatus, relative to the supporting base 2.

In other versions not shown of the support according to the invention, the spherical ball is rigidly attached to the base, or to a generic supporting member, while the shell-shaped body is formed in the column, or rigidly attached in another manner to said column.

The shell-shaped body 5 is provided with an internal surface "Si" which delimits the housing cavity 10 of the spherical ball 6, as described in greater detail below.

The spherical ball 6 is externally delimited by an external surface "Se" which, in use, at least partially faces the internal surface "Si" of the shell-shaped body 5.

The internal surface "Si" of the shell-shaped body 5 that delimits the housing cavity 10 and the spherical ball 6 are reciprocally shaped in such a way that between the external surface "Se" of the spherical ball 6 and the internal surface "Si" of the housing cavity 10 is defined a gap 11 containing a viscous fluid "V" suitable for regulating the rotations of the spherical ball 6 in the housing cavity 10, as explained in greater detail below.

The viscous fluid "V" is interposed in use between the external surface "Se" of spherical ball 6 and the internal surface "Si" of the housing cavity 10 so as to bathe both the above indicated surfaces and to provide friction to the movement of the spherical ball 6 inside the housing cavity 10, as explained in greater detail below.

In this way, a viscous articulation device is therefore obtained.

The presence of the viscous fluid "V" interposed between the external surface "S" of the spherical ball 6 and the internal surface "Si" of the housing cavity 10 makes it possible to dampen the vibrations arising in the movement of the spherical ball 6 during the orientation of the column 3 relative to the supporting base 2, improving the steadying of the video-photographic apparatus attached thereto.

The viscous fluid "V" also makes it possible to provide friction to the movement of the spherical ball 6 in the housing cavity 10, damp any impacts, and therefore increase the stability of the column 3.

The fluid "V" also allows the movement of the spherical ball 6 to be made smoother, i.e. free from shakes. Thus, the steadying of the video-photographic apparatus attached to the column 3 is made smoother and free from shakes.

The provision of the gap 11 between the housing cavity 10 and the spherical ball 6 makes it possible to ensure a predetermined lubrication on the spherical ball 6 and therefore ensure a predetermined degree of friction in the actuation of the monopod of the invention, as explained in greater detail below.

The gap 11 has a thickness "d" comprised between 0.05 and 0.5 mm, preferably between 0.05 and 0.2 mm, more preferably approximately 0.1-0.2 mm, and most preferably approximately 0.1 mm.

Using these thicknesses, effective shock absorption is obtained, as well as good regulation of the friction exerted on the spherical ball.

Preferably, the thickness "d" of the gap 11 is essentially constant over said gap 11. The provision of a gap 11 with a constant and predefined thickness "d" makes it possible to regulate the friction effect that can be obtained with the monopod of the invention.

By varying the thickness "d" of the gap 11, it is possible to modify and regulate the friction effect that can be obtained with the monopod of the invention.

The gap 11 has the shape of a spherical area, as explained in greater detail below, in such a way that in certain areas of the housing cavity 10, the spherical ball 6 is in direct contact with the internal surface Si of the shell-shaped body 5, i.e. without any interposition of the viscous fluid "V".

This makes it possible to increase the precision of the positioning of the spherical ball, as explained in greater detail below.

The viscous fluid V is preferably a silicone-based grease.

Particularly suitable to be used for producing the viscous articulation device of the invention are fluids or viscous means that provide a force of friction that increases as the the relative speed between the two walls in rotation increases, i.e. between the external surface "Se" of the spherical ball 6 and the internal surface "Si" of the housing cavity 10.

Fluids suitable for this purpose are described, for example, in U.S. Pat. No. 4,899,854 in the name of Cartoni.

The column 3 comprises a cylindrical body with predominantly longitudinal extension along a longitudinal axis Z', extending between two opposing longitudinal ends 3a, 3b, the first longitudinal end 3a being rigidly attached to the spherical ball 6, while the second longitudinal end 3b is provided with attachment means, not shown in the figures, for attaching a video-photographic apparatus, also not shown, to the monopod 1.

The attachment means are known per se in the field and are not described in detail. In this version, the column 3 and the attachment means serve as means for rigidly securing the spherical ball 6 to the video-photographic apparatus.

The column 3 is preferably of the telescopic type, i.e. formed by a plurality of tubular members, each housed inside the adjacent member in such a way as to allow them to reciprocally slide along the longitudinal axis Z' of said column 3 in order to vary its overall length. The number of tubular members and their length are selected on the basis of specific construction requirements and/or heights to be reached with the monopod 1.

The column 3 can be advantageously provided with locking devices, not shown, for locking the tubular members in a desired reciprocal position.

The shell-shaped body 5 comprises a cup-shaped body 8, a supporting element 9 for the spherical ball 6 and a positioning ring 17, all of them cooperating to form the housing cavity 10 for the spherical ball 6, as explained in greater detail below.

The supporting base 2 comprises a cup-shaped body 8 with a base portion 8a facing in use towards the ground, shaped in such a way as to form a cavity 8c that is open on the opposite side with respect to the base portion. The cavity 8c has an inner wall S1 that is more or less spherical and intended to house inside it the spherical ball 6, as explained in greater detail below.

For reasons of mounting of the support of the invention, the cavity 8c of the cup-shaped body 8 is dimensioned in such a way as to house the spherical ball 6 essentially as far as, but not beyond the equator "E" of the same; in other words, the cup-shaped body 8 is dimensioned in such a way as to house at most a semi-sphere in the housing cavity 10.

In the version shown, the cup-shaped body 8 is dimensioned in such a way as to house a semi-sphere in the housing cavity 10, so that the equator "E" of the spherical ball is placed at the free end 8D of the cup-shaped body 8.

The cup-shaped body 8 is further provided with a side wall 8b from which extend three legs 20 articulated, via a respective pivot pin 21, to the cup-shaped body 8 in such a way as to be capable of oscillating relative to the latter between an extended position, shown in the Figures, in which the legs 20 are moved outwards from the cup-shaped body 8 in the radial direction and form a tripod supporting element for the monopod 1, and a resting position, not shown in the figures, in which the legs are drawn inwards towards the cup-shaped body 8.

The legs 20 are provided with supporting feet 22 for improving the support of the monopod 1 on the ground or on the desired supporting surface.

Inside the cup-shaped body 8 it is also provided a supporting member 9 positioned in proximity to the supporting portion 8A of the cup-shaped body 8 in such a way as to protrude inside the cavity 8c with respect to the internal wall S1 of the same. The supporting member 9 is provided with a supporting wall 9A intended to support the spherical ball 6 and shaped in such a way as to form-fit with the external surface "Se" of said spherical ball 6.

The supporting member 9 is positioned below the centre of gravity of the spherical ball 6, in such a way that the weight of the spherical ball 6 bears on the supporting wall 9A.

In a version not shown, the supporting member 9 is provided at the antipode of the centre of gravity.

In other words, the supporting member 9 is provided at one of the two ends of the vertical axis of the spherical ball 6, the axis of said spherical ball 6 being the straight line joining the two poles of said spherical ball 6.

The presence of the supporting member 9 makes it possible to centre the spherical ball 6 in the housing cavity 10, to render the thickness of the gap 11 constant by creating a more uniform distribution of the grease inside the gap 11, and to prevent unwanted leaks of said grease inside said gap 11.

The supporting member 9 is positioned in such a way as to close the gap 11, so that around the supporting member 9 the spherical ball 6 is in direct contact with the supporting member 9 without any substantial interposition of the viscous fluid "V".

The supporting wall 9A therefore closes and delimits the gap 11.

This allows the positioning of the spherical ball 6 in the housing cavity 10 to be made more stable with any orientation of the column 3 relative to the supporting base 2.

By varying the position of the supporting member 9 relative to the cavity 8c, the thickness "d" of the gap 11 is varied, and therefore the friction generated during the action of the spherical ball 6 in the housing cavity 10 is also varied.

In the version shown, the supporting member 9 comprises a pad made of a technopolymer with a low coefficient of friction, for example PTFE.

The shell-shaped body 5 further comprises an adjusting element 90, capable of being actuated by a user in order to move the supporting member 9 relative to the spherical ball 6 so as to vary the pressure exerted by the supporting member 9 on the sphere.

Conveniently, by acting on the adjusting element 90 it is possible to move the supporting member 9 in such a way as to lock the spherical ball 6 in the housing cavity 10 and prevent its rotation.

The presence of the adjusting element 90 is particularly preferred when the supporting member 9 is provided in the antipodal position relative to the centre of gravity of the spherical ball 6.

In versions not shown of the support of the invention, the adjusting element may not be provided, in which case the position of the supporting member 9 is defined at the design stage.

In other versions not shown, the supporting member 9 is created integrally with the cup-shaped body 8, possibly co-moulded with the same; in this case too, if desired, the position of the supporting member 9 may be defined at the design stage or regulated by means of suitable adjusting elements.

The monopod 1 further comprises a ring-shaped element 12, fixable by means of fixing elements 13 that are known per se, to the cup-shaped body 8 and cooperating with the latter to define the shell-shaped body 5.

The ring-shaped element 12 is provided with a through opening 14 whose free edge 14a, facing in the opposite direction with respect to the cup-shaped body 8, limits by interference the ability for the spherical ball 6 to be oriented relative to the shell-shaped body 5, as explained in greater detail below.

The internal profile 34 of the through opening 14 is shaped in such a way as to define on the ring-shaped element 12 a housing recess 15 open towards the cup-shaped body 8 and arranged to receive a sealing gasket 16, a seating 35, open on the opposite portion with respect to the cup-shaped body 8 and positioned in an intermediate position along the longitudinal axis of the ring-shaped element 12 between the recess 15 and the free edge 14a, and a protrusion 34c suitable for separating the recess 15 and the seating 35.

The seating 35 is intended to house a spacer element for centring the monopod 1, as explained in greater detail below.

The sealing gasket 16 is intended to abut the spherical ball 6 and is dimensioned to close the gap 11 in such a way as to prevent unwanted losses or leaks of the viscous fluid "V" contained therein.

The sealing gasket 16 is made of an elastomeric material.

The shell-shaped body 5 further comprises a positioning ring 17 interposed between the cup-shaped body 8 and the ring-shaped element 12 and intended to couple with play with the spherical ball, as explained in greater detail below.

The positioning ring 17 is preferably made of a technopolymer.

The positioning ring 17 therefore cooperates with the cup-shaped body 8 to define the housing cavity 10 of the spherical ball 6, and allows the latter to be secured in said housing cavity 10.

The positioning ring 17 also cooperates to define the gap 11, as explained in greater detail below.

The internal profile of said positioning ring 17 is shaped in such a way as to comprise a first portion 17A, facing in use towards the cup-shaped body 8 and cooperating with the latter to define the gap 11, and a second portion 17B facing in use towards the ring-shaped element 12 and placed at a distance from the external surface Se of the spherical ball 6 that is smaller with respect to the first portion 17A.

On the second portion 17B, is defined an amount of play between the external surface Se and the positioning ring that is less than the thickness "d" of the gap 11. The provision of a smaller amount of play makes it possible to reduce leakage from the gap 11 of viscous fluid "V" caused by the spherical ball 6 in its movement in the housing cavity 10.

The internal surface "Si" of the housing cavity 10 is therefore delimited by the internal wall "S1" of the cup-shaped body 8, the supporting wall 9A of the pad 9 and the internal profile of the first portion 17A of the positioning ring 17, and is closed, on the opposite side with respect to the base portion 8a, by the sealing ring 16.

Advantageously, in the version shown, the positioning ring 17 is positioned on a circumference of the spherical ball 6 that has an extension less than that of the equator "E" of said spherical ball, in such a way that, as previously mentioned, the equator "E" of the spherical ball 6 is placed at the free end 8D of the cup-shaped body 8.

The positioning ring 17 makes it possible to improve the positioning and centring of the spherical ball 6 in the housing cavity 10 and to reduce leaks of viscous fluid "V". In the version shown in FIGS. 5 and 5A, the monopod 1' of the invention further comprises an additional gasket 160' positioned in an intermediate position between the sealing gasket 16' and the positioning ring 17' and arranged in such a way as to close the gap 11 in order to prevent unwanted leaks of viscous fluid "V" from said gap 11.

The presence of the additional gasket 160' provides a further sealing element for the viscous fluid "V", and cooperates with the gasket 16' to improve the containment of the viscous fluid "V" inside the gap 11'.

Advantageously, the additional gasket 160' is made of a technopolymer, preferably PTFE.

Advantageously, the monopod further comprises a distance piece 55' interposed between the ring-shaped element 12 and the additional gasket 160' and arranged to press the additional gasket 160' against the external surface "Se" of the spherical ball 6.

The gap 11 defined in the support of the invention has the form of a spherical area delimited, as mentioned previously, by the supporting surface 9A of the supporting member 9 and by the second portion 17B of the positioning ring 17 and closed by the gasket 16 and/or by the additional gasket 160' if provided.

The gap 11 preferably has an extension such as to extend over a portion of the external surface Se of the spherical ball 6 equal to or greater than 50% of the overall external surface Se of said spherical ball 6.

This makes it possible to improve the friction effect that can be obtained with the support of the invention, and to optimise the movement of the spherical ball 6 inside the housing cavity 10.

Advantageously, in addition, the gap 11 is formed in such a way as to extend at least along an equatorial band E1 of the spherical ball 6, i.e. around the equator "E" of said spherical ball, so that the equator "E" of said spherical ball 6 is situated inside said gap 11.

Preferably, the gap 11 extends along an equatorial band E1 defined by the central angle "α" of the spherical ball 6 equal to approximately 20°.

Advantageously, the equatorial band E1 is symmetrical with respect to the equator "E" of the spherical ball 6.

The provision of the gap 11 around the equator "E" of the spherical ball 6 makes it possible to improve, in particular, the positioning of the spherical ball 6 about the panoramic axis.

This is because, in the oscillation about the panoramic axis, the equator "E" of the spherical ball 6 is the part of the spherical ball 6 that is subjected to the greatest stress, since it is the part positioned furthest away from the axis of oscillation.

The friction effect caused by the viscous fluid "V" placed inside the gap 11 is proportional to the force applied and to the centre of gravity arm, i.e. the distance from the centre of gravity of the spherical ball 6. Therefore, the provision of the gap 11 in an equatorial band E1 makes it possible to optimise the movement of the spherical ball 6 and to optimise the friction effect that can be obtained, since there is increased damping of the variations in speed due for example to hesitancy, shakes, etc.

This contrivance also allows the oscillation movement of the spherical ball 6 about the panoramic axis, as well as relative to the axis of inclination, to be made smoother. A damping of the vibrations caused in the oscillation about the tilt axis is also obtained.

The steadying of the video-photographic apparatus along any axis of oscillation is therefore optimised and made smooth.

The monopod 1 further comprises a cylindrical shank 19 having a tubular body 19c with longitudinal development, rigidly attached at its two opposing longitudinal end portions 19a, 19b respectively to the spherical ball 6 and to the first longitudinal end 3a of the column 3.

The shank 19 extends from the supporting base 2 and is therefore operatively interposed between the column 3 and the spherical ball 6, and makes it possible to rigidly attach the column 3 to the spherical ball 6, rendering said column 3, and therefore the video-photographic apparatus, orientable relative to the supporting base 2.

The spherical ball 6 is provided with a blind hole 18 in which is fixed the first longitudinal end 19a of the shank 19, arranged in such a way that the shank 19 extends radially from the spherical ball 6.

In the version shown, the blind hole 18 is threaded, the first longitudinal end 19a being fixed by screwing in said blind hole 18, and, similarly, the second longitudinal end 19b is screwed to the first end of the column 3a. However, other ways of fixing the shank 19 to the spherical ball 6 and/or to the column may be provided.

In a version not shown, the shank may itself be provided with attachment means for attaching a video-photographic apparatus to the spherical ball 6, the shank and the attachment means serving as means for rigidly securing the spherical ball 6 to the video-photographic apparatus.

In this version too, furthermore, the spherical ball is rigidly attached to the base, or to a generic supporting member, while the shell-shaped body is created in the column or rigidly attached in another manner to said column.

This version of the support with viscous spherical articulation according to the invention is particularly compact.

In another version, the shank may be attached to a supporting member, such as a cross member of a tripod or a column fixed to a supporting base, and the shell-shaped body is therefore provided with attachment means for attaching a video-photographic apparatus.

The monopod 1 further comprises a centring device 30 capable of being actuated in order to adjust the possibility of mutual orientation between the first and second articulation members.

The centring device 30 comprises a knob 31 fitted on to the cylindrical body 19c of the shank 19 and capable of being maneuvered in order to actuate the centring device 30.

In particular, the knob 31 is movable between a releasing position W, shown in FIGS. 1-3 and 5A, in which the knob 31 is fixed to the second end 19b of the shank 19 adjacent to the column 3, i.e. in a position distant from the spherical ball 6, and a centring configuration W', shown in FIGS. 4, 4A and 5, in which the knob 31 is fixed to the first end 19a of the shank 19 adjacent to the spherical ball 6 and is housed in the seating 35 and acts as a centring element for the column 3, as explained in greater detail below.

The knob 31 has the form of a ring and defines a longitudinal hole in which is inserted the shank 19 comprising a fixing portion 32 arranged to be fixed alternatively to the first and to the second longitudinal end 19a, 19b of the shank 19 in order to allow the stable fixing of the knob 31 in the releasing configuration W and in the centring configuration W'.

In the version shown in FIGS. 1-4, the fixing portion 32 is threaded, the shank 19 being provided with corresponding threaded portions capable of being coupled with the threading of the fixing portion 32. However, in other versions not shown, suitable fixing means other than threading may be provided for fixing the knob 31 to the shank 19.

In the releasing configuration W, the knob 31 is attached to the second end 19b of the shank 19 and the column 3 can be moved relative to all three axes (panoramic, tilt and level) in order to be oriented relative to the supporting base 2, and the free edge 14a of the through opening 14 constitutes the abutment element for the movement of the column 3.

In the centring configuration W', the knob 31 is inserted in the through hole 14 in such a way as to limit the rotation of the spherical ball 6 and acts as a centring distance element.

The knob 31 can be pushed in the centring configuration W' until, as shown in FIGS. 4A and 5, an edge 31A of the knob butts up against the external surface "S" of the spherical ball 6.

Alternatively, in a configuration not shown, the knob 31 is stopped at the bottom of the threaded portion of the shank.

The dimensions of the knob 31 are such that in the centring configuration W', a space 50 is defined between the outer edge 31B of the knob 31 and the internal profile 34 of the through opening 14, i.e. such that a degree of play is permitted between the knob 31 and the ring-shaped element 12.

In this configuration, since the fixing portion 32 is fixed without play to the shank 19, the movement of the spherical ball 6 from the vertical axis Z is prevented by the interference of the knob 31 on the internal profile 34 of the through opening 14, and is therefore extremely limited.

However, in this configuration the rotation of the column 3 along the vertical axis Z is permitted, i.e. about the axis of the shank 19. The presence of the space 50 between the knob 31 and the ring-shaped element allows the rotation of the column 3 about the panoramic axis to be easy, and means that high levels of friction do not need to be overcome.

At the same time, the mutual interference between the knob 31 and the ring-shaped element 12 allows the monopod 1 to be rendered stable in the centring configuration W', since undesired movements of the column 3 from the vertical axis are prevented.

With the knob 31 in the centring configuration W', the shank 19, and therefore the column 3, can only take a position perpendicular to the supporting plane of the supporting base 2, any movement from this position being prevented, apart from the space 50, due to interference of the knob 31 against the ring-shaped element 12.

When the supporting plane is horizontal, the column extends along a vertical axis and is therefore sufficiently stable to remain in position even without the monopod being held by a hand of the operator.

It is also possible, in the centring configuration W', to perform smooth panoramic filming by rotating the column about the panoramic axis, since panoramic rotation is permitted.

The knob 31 is provided with grip portions 51 intended to be gripped by an operator in order to actuate said knob 31.

In the version of the monopod shown in FIGS. 5 and 5A, the knob 31 of the centring device 30' is shaped in such a way as to engage with a click action with the shank 19' in order to fix the knob 31' to the shank 19'. The knob 31' is provided with an actuating pin 61' extending inside the knob 31', operatively interposed between an actuating button 63' and a preload spring 62.

The pin 61' is provided with engaging teeth 64' capable of engaging with a click action with corresponding recesses 65' provided on the wall of the shank 19'.

When the actuating button 63' is actuated, the pin 61' is moved in such a way as to disengage the engaging teeth 64' from the recesses 65' and unlock the knob 31' relative to the shank 19' in order to move it along said shank 19'.

The preload spring 62' is configured to push the engaging teeth 64' inside the corresponding recesses in order to lock the knob 31' relative to the shank 19'.

The viscous spherical coupling of the invention makes it possible to considerably increase the quality of filming that can be obtained with an apparatus attached to said spherical coupling.

The spherical coupling with viscous friction according to the invention makes it possible to obtain a support, tripod, monopod or supporting head for video-photographic apparatus with which to perform smooth video filming along all three axes of rotation.

This advantage is obtained by means of the viscous spherical coupling of the invention, maintaining a high degree of dimensional compactness of the obtained support.

It is possible to obtain a monopod or support that is much more compact with respect to a monopod of the type provided in WO2007/039000. This difference is still more evident when it is considered that with the viscous coupling of the invention it is not necessary to provide dedicated viscous couplings to improve movement along the three different orthogonal axes.

In addition, the centring device of the support according to the invention allows the support/apparatus system to be securely stood in the vertical position, avoiding the risk of accidental falls, even without the presence of the operator's hand.

In addition, the centring device of the support according to the invention makes it possible to maintain the possibility of performing smooth panoramic filming in situations where tilt/level movements are not required, for example for wide-field filming on horizontal supporting planes.

As mentioned above, the spherical coupling of the invention can also be provided on a tripod, for example on the cross member of the same, so as to obtain a supporting tripod for video-photographic apparatus with which to perform particularly smooth and high-quality filming.

In this case, the video-photographic apparatus is attached by suitable attachment means directly to the shank of the spherical ball or to the shell-shaped body of the articulation device.

The spherical coupling of the invention can also be used in a ball-joint positioning head.

As pointed out above, the first and second articulation members of the fluid articulation device can be attached equally to the video-photographic apparatus or to the supporting member, obtaining in either case a support with viscous ball-joint articulation having the advantages indicated above.

The invention claimed is:

1. Orientable support (1) for video-photographic apparatus, comprising an articulation device (4) with a first (5) and a second articulation member (6) provided with respective attachment means for being attached respectively to a supporting member (2, 20) of said support (1) and to a video-photographic apparatus, or vice versa, and reciprocally movable in order to orient said video-photographic apparatus with respect to said supporting member (20), said first articulation member comprising an internally hollow shell-shaped body (5) defining a housing cavity (10) for said second articulation member (6), said second articulation member comprising a spherical ball (6) capable of sliding in said housing cavity (10), said ball (6) and said housing cavity (10) being shaped in such a way that a gap (11) is formed therebetween, said gap (11) containing a viscous fluid (V) suitable for regulating the rotations of said ball (6) in said housing cavity (10), wherein said gap (11) has a thickness comprised between 0.05 and 0.5 mm, wherein said shell-shaped body (5) further comprises a cup-shaped body (8) with a base portion (8a) facing in use towards the ground, shaped in such a way as to form a cavity (8c) that is open on the opposite side with respect to said base portion (8a) and has an internal wall (S1) that is more or less spherical and intended to house inside it said spherical ball (6), and wherein said shell-shaped body (5) further comprises a ring-shaped element (12) fixable to said cup-shaped body (8) and provided with a through opening (14) whose free edge (14a), facing in the opposite direction with respect to said cup-shaped body (8), limits by interference the ability for said video-photographic apparatus to be oriented with respect to said supporting member, and wherein said shell-shaped body (5) comprises a positioning ring (17) interposed between said cup-shaped body (8) and said ring-shaped element (12) and intended to be coupled with play to said spherical ball (6).

2. Support according to claim 1, wherein said viscous fluid (V) comprises a silicone-based grease.

3. Support according to claim 1, wherein said gap (11) has an extension such as to extend over a portion of the external surface (Se) of said spherical ball (6) equal to or greater than 50% of the overall external surface (Se) of said spherical ball (6).

4. Support according to claim 1, wherein said gap (11) is formed in such a way as to extend at least over an equatorial band (E1) of said spherical ball (6) so that the equator (E) of said spherical ball (6) is situated inside said gap (11).

5. Support according to claim 4, wherein said equatorial band (E1) is defined by a central angle (a) of said spherical ball (6) equal to approximately 20°.

6. Support according to claim 1, wherein said shell-shaped body (5) comprises a supporting member (9) provided in a supporting portion (8A) of said shell-shaped body (5) and shaped in such a way as to protrude into said housing cavity (10) with respect to the internal surface (Si) of said shell-shaped body (5) and intended to support a base portion (6A) of said spherical ball (6).

7. Support according to claim 6, wherein said supporting member comprises a pad (9) made from a material with a low coefficient of friction, having a supporting wall (9A) shaped in such a way as to form-fit with the external surface (S) of said spherical ball (6).

8. Support according to claim 7, wherein said supporting member (9) is created integrally with said shell-shaped body (5).

9. Support according to claim 1, wherein said shell-shaped body (5) is provided with a sealing gasket (16) arranged to abut said spherical ball (6) and close said gap (11) in order to prevent unwanted leaks of said viscous fluid (V).

10. Support according to claim 1, wherein said positioning ring (17) is shaped in such a way as to comprise a first portion (17A), facing in use towards said cup-shaped body (8) and cooperating with the latter to define said gap (11), and a second portion (17B) facing in use towards said ring-shaped element (12) placed at a distance from said external surface (Se) of said spherical ball (6) that is smaller with respect to the first portion (17A).

11. Support according to claim 1, and further comprising an additional gasket (160') positioned in an intermediate position between said sealing gasket (16') and said positioning ring (17') and arranged in such a way as to close said gap (11).

12. Support according to claim 1, wherein said second articulation member comprises a radial stem (19), extending from said spherical ball (6), said support further comprising a centring device (30) movable along said stem (19) between a releasing configuration (W) in which said video-photographic apparatus is movable in three orthogonal axes (X, Y, Z) with respect to said supporting member (20) and a centring configuration (W') in which a centring element (31) of said centring device (30) is inserted into an opening (14) of said shell-shaped body (5) in such a way as to essentially prevent the movement of said apparatus with respect to the panoramic axis, and to allow the movement of said apparatus about the panoramic axis (Z).

13. Support according to claim 1 and further comprising a column of essentially longitudinal extension (Z') rigidly attached at its two opposite extremities (3a, 3b) respectively to said spherical ball (6) and to said attachment means for said video-photographic apparatus.

14. Support according to claim 1, wherein said gap (11) has a thickness comprised between 0.05 and 0.2 mm.

15. Support according to claim 1, wherein said gap (11) has a thickness comprised between 0.1 and 0.2 mm.

16. Support according to claim 1, wherein said gap (11) has a thickness of approximately 0.1 mm.

* * * * *